US009804321B1

(12) United States Patent
Simon

(10) Patent No.: US 9,804,321 B1
(45) Date of Patent: Oct. 31, 2017

(54) LED OPTICS FOR BULBS AND LUMINAIRES

(71) Applicant: Burns & Levinson LLP, Boston, MA (US)

(72) Inventor: Jerome Simon, Newton Centre, MA (US)

(*) Notice: Subject to any disclaimer, the term of this patent is extended or adjusted under 35 U.S.C. 154(b) by 129 days.

(21) Appl. No.: 14/556,918

(22) Filed: Dec. 1, 2014

Related U.S. Application Data

(63) Continuation of application No. 13/705,684, filed on Dec. 5, 2012, now Pat. No. 8,899,783.

(60) Provisional application No. 61/741,173, filed on Jul. 13, 2012, provisional application No. 61/630,119, filed on Dec. 5, 2011.

(51) Int. Cl.
| | | |
|---|---|---|
| *F21V 1/00* | (2006.01) | |
| *F21V 8/00* | (2006.01) | |
| *F21K 99/00* | (2016.01) | |

(52) U.S. Cl.
CPC .............. *G02B 6/0073* (2013.01); *F21K 9/50* (2013.01); *G02B 6/003* (2013.01); *G02B 6/0031* (2013.01); *G02B 6/0045* (2013.01); *G02B 6/0075* (2013.01)

(58) Field of Classification Search
CPC . F21Y 2107/30; F21Y 2107/20; F21V 29/004
See application file for complete search history.

(56) References Cited

U.S. PATENT DOCUMENTS

| | | | |
|---|---|---|---|
| 3,739,169 A | 6/1973 | Weinreich | |
| 6,443,604 B1 | 9/2002 | Rudenberg | |
| 6,598,996 B1* | 7/2003 | Lodhie | B60Q 1/2607 |
| | | | 362/235 |
| 6,948,830 B1* | 9/2005 | Petrick | F21V 5/045 |
| | | | 362/228 |
| 7,837,359 B2 | 11/2010 | Danek et al. | |
| 8,461,748 B1* | 6/2013 | Taj | F21V 29/773 |
| | | | 313/318.01 |
| 8,882,284 B2 | 11/2014 | Tong et al. | |
| 8,992,040 B2 | 3/2015 | Henri et al. | |
| 2005/0146884 A1 | 7/2005 | Scheithauer | |
| 2007/0025121 A1 | 2/2007 | Harada et al. | |
| 2012/0236549 A1* | 9/2012 | Leibowitz | A63B 71/0686 |
| | | | 362/184 |

\* cited by examiner

*Primary Examiner* — Evan Dzierzynski
(74) *Attorney, Agent, or Firm* — Burns & Levinson, LLP; Jerry Cohen; David Gomes

(57) ABSTRACT

An LED light bulb provides a supporting structure having a central axis, a substantially circular configuration of LEDs surrounding said central axis and mounted to said supporting structure, a bulb envelope surrounding the central axis and enclosing the circular configuration of LEDs, and at least one of the LEDs being at least partially surrounded by a light collecting optic having an optical axis radiating outwardly from the central axis, that collects and projects light emanating from the LEDs as a concentrated beam along and surrounding the optical axis of the light collecting optic away from the bulb envelope.

2 Claims, 9 Drawing Sheets

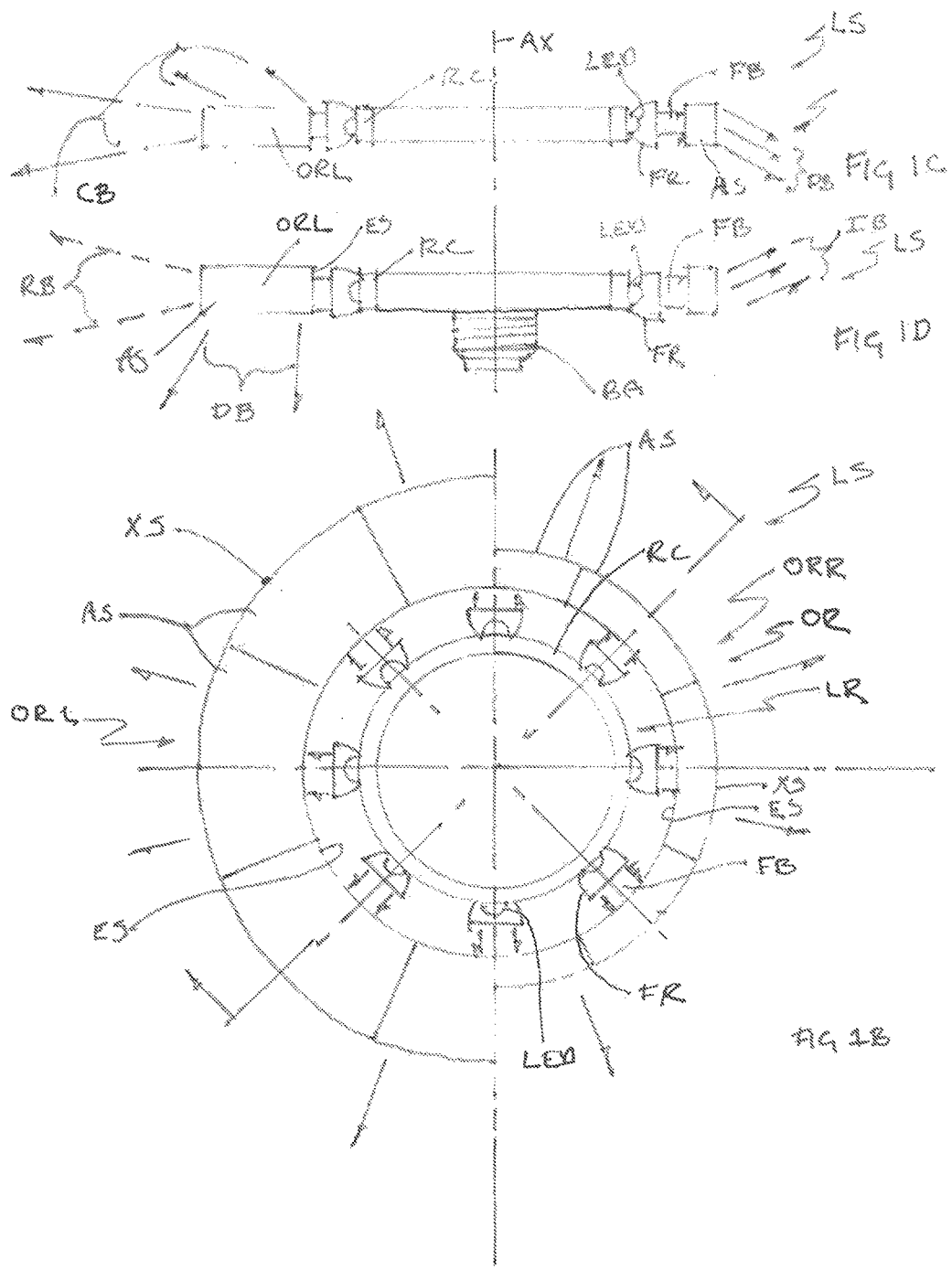

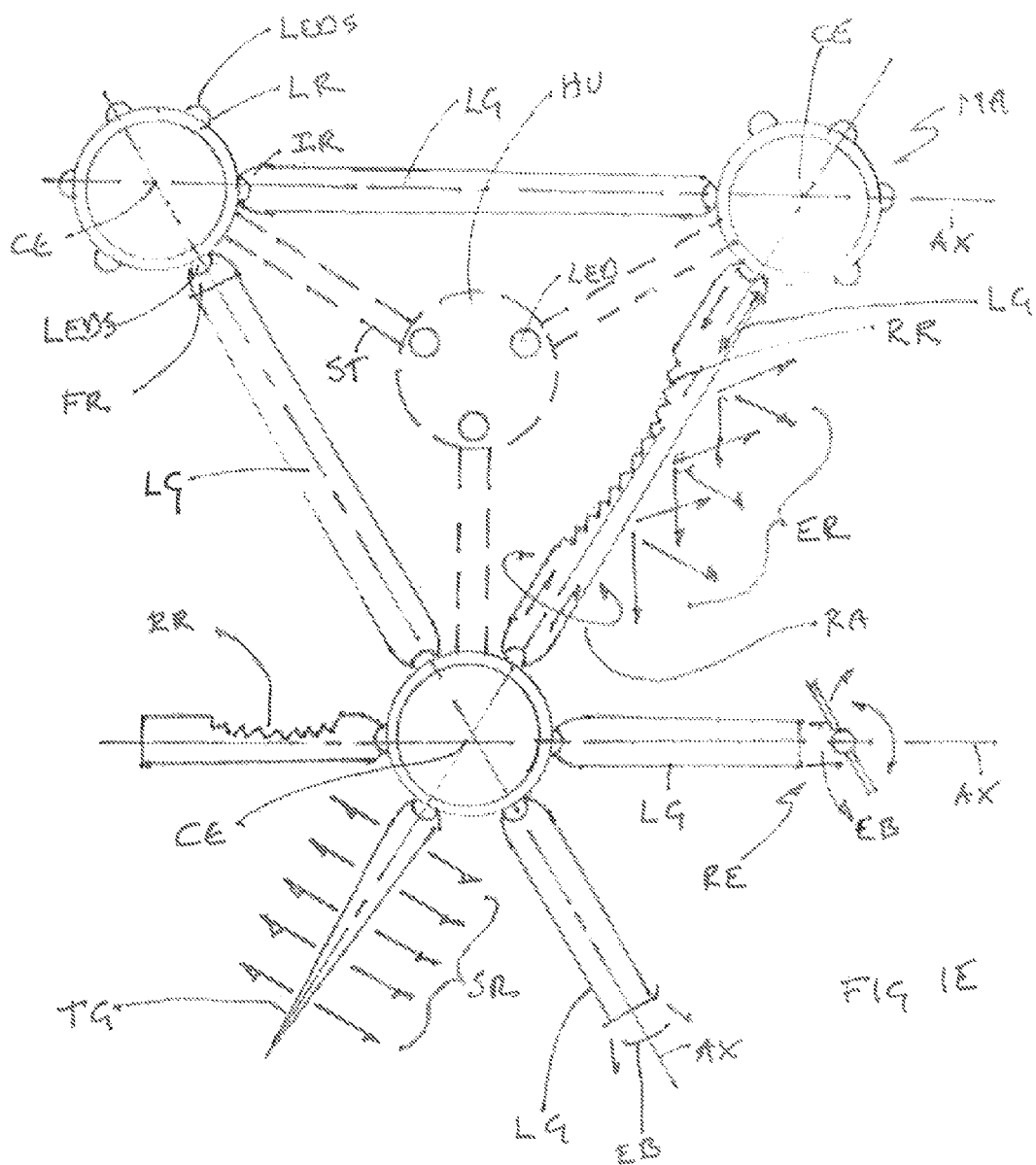

EXISTING TECHNOLOGY

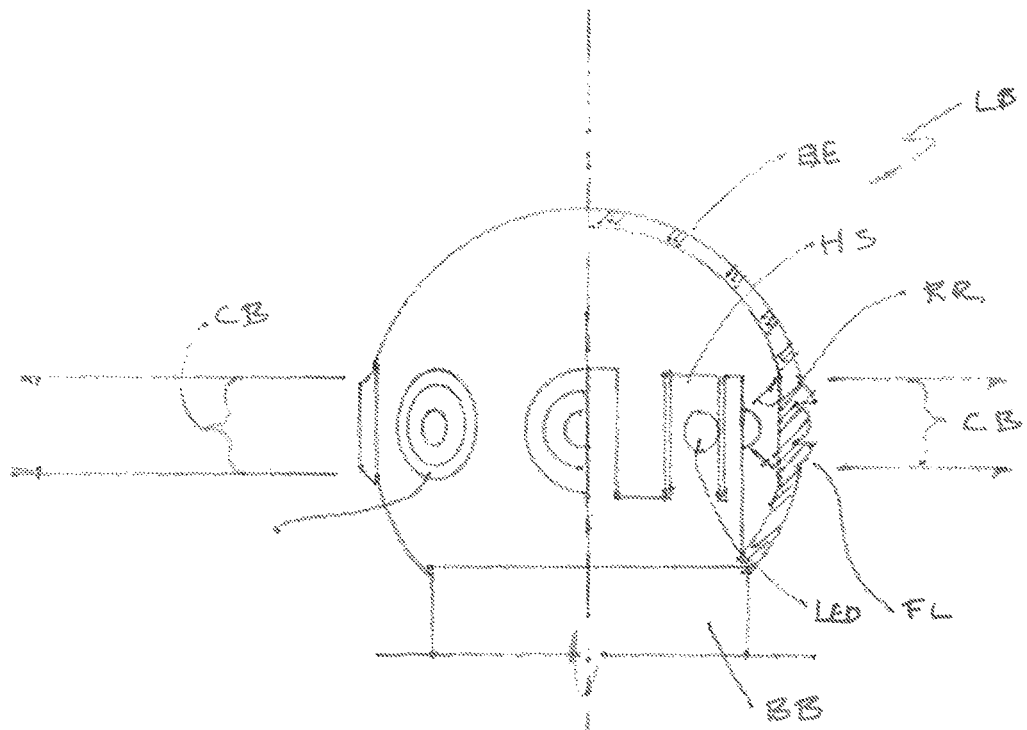

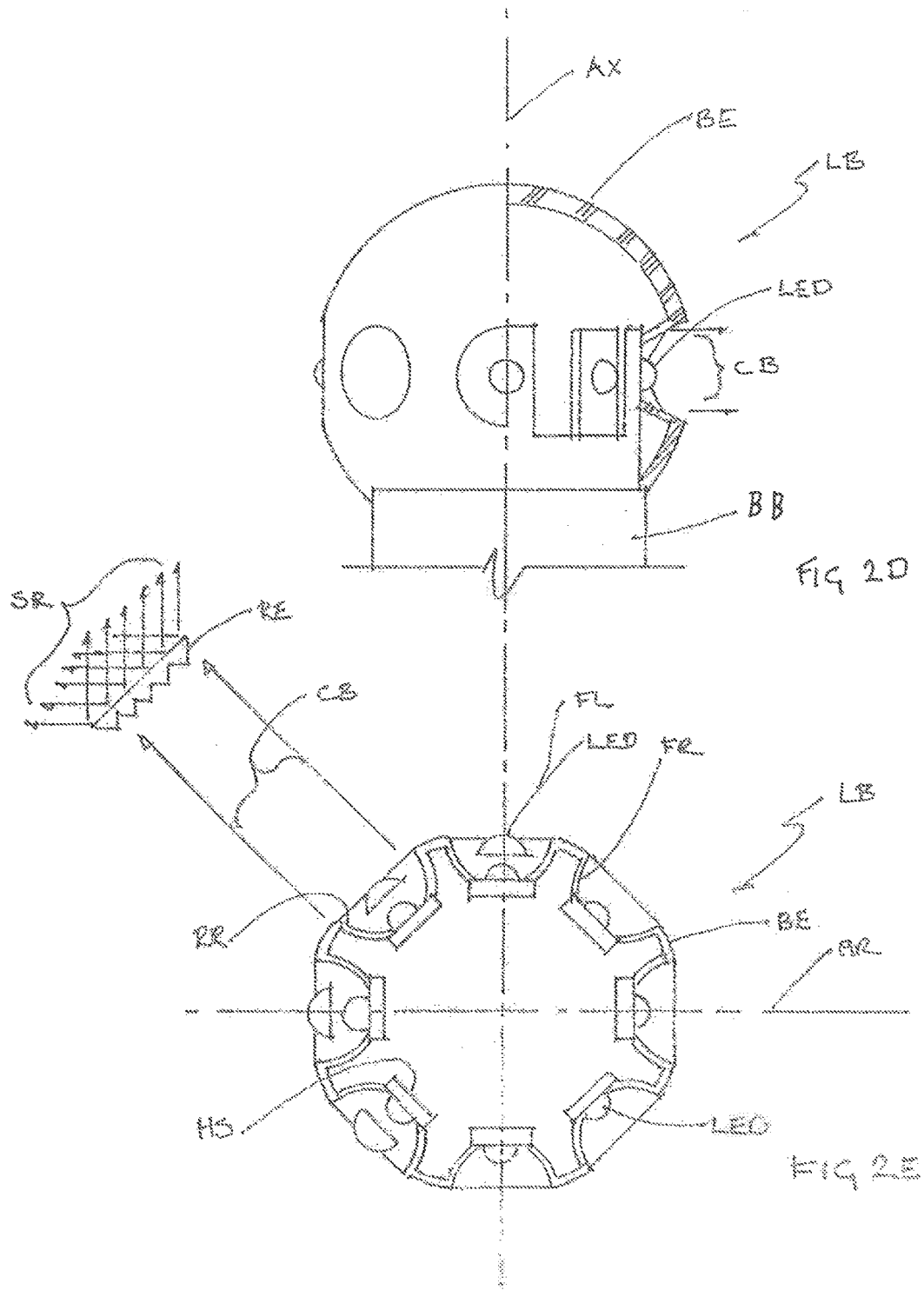

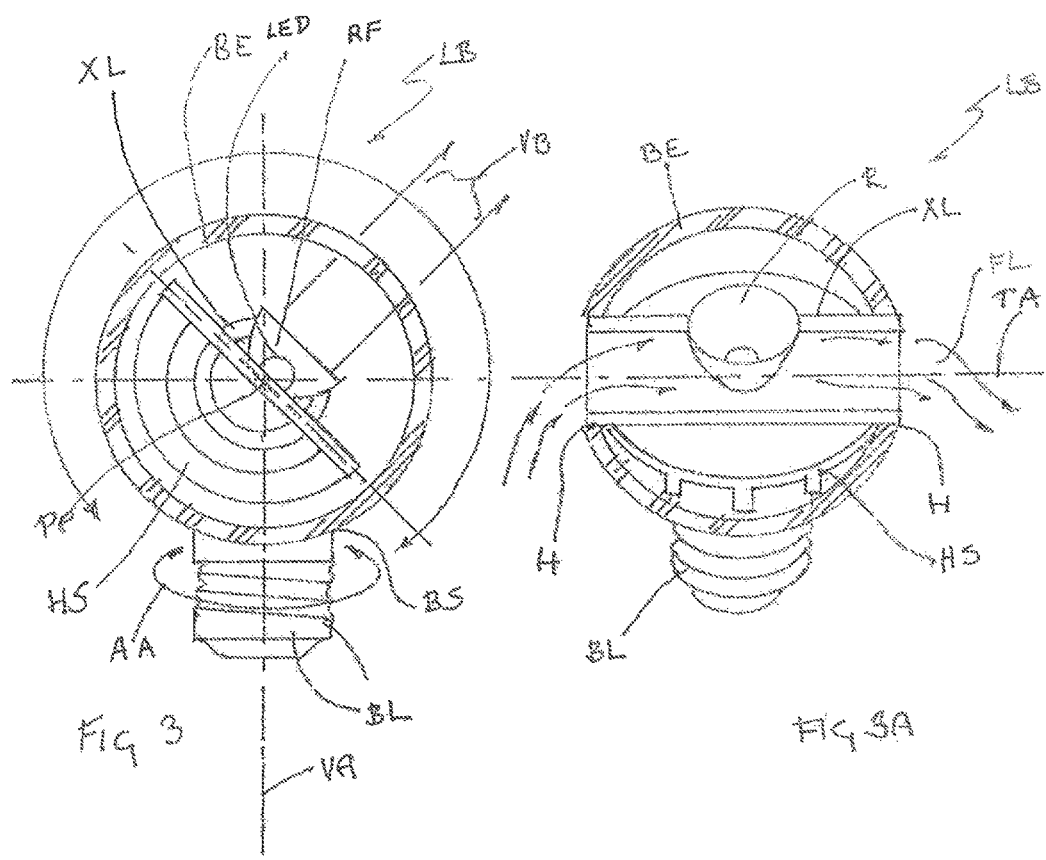

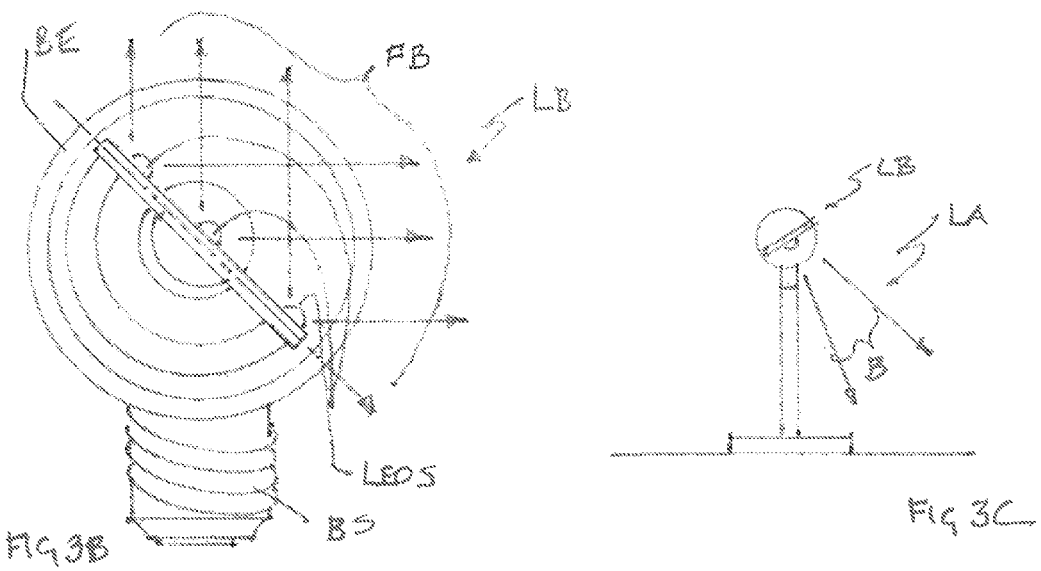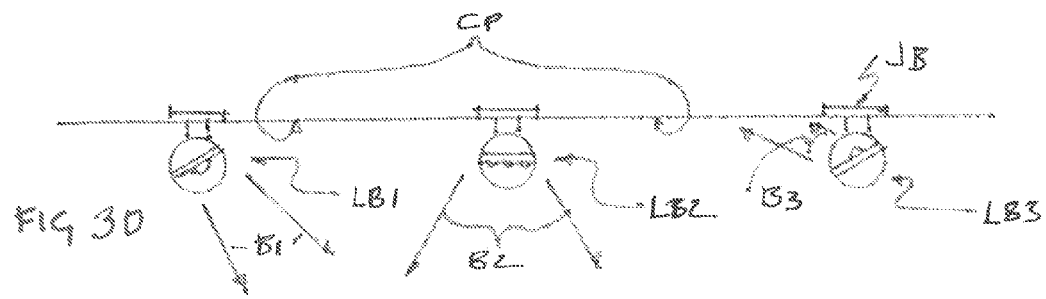

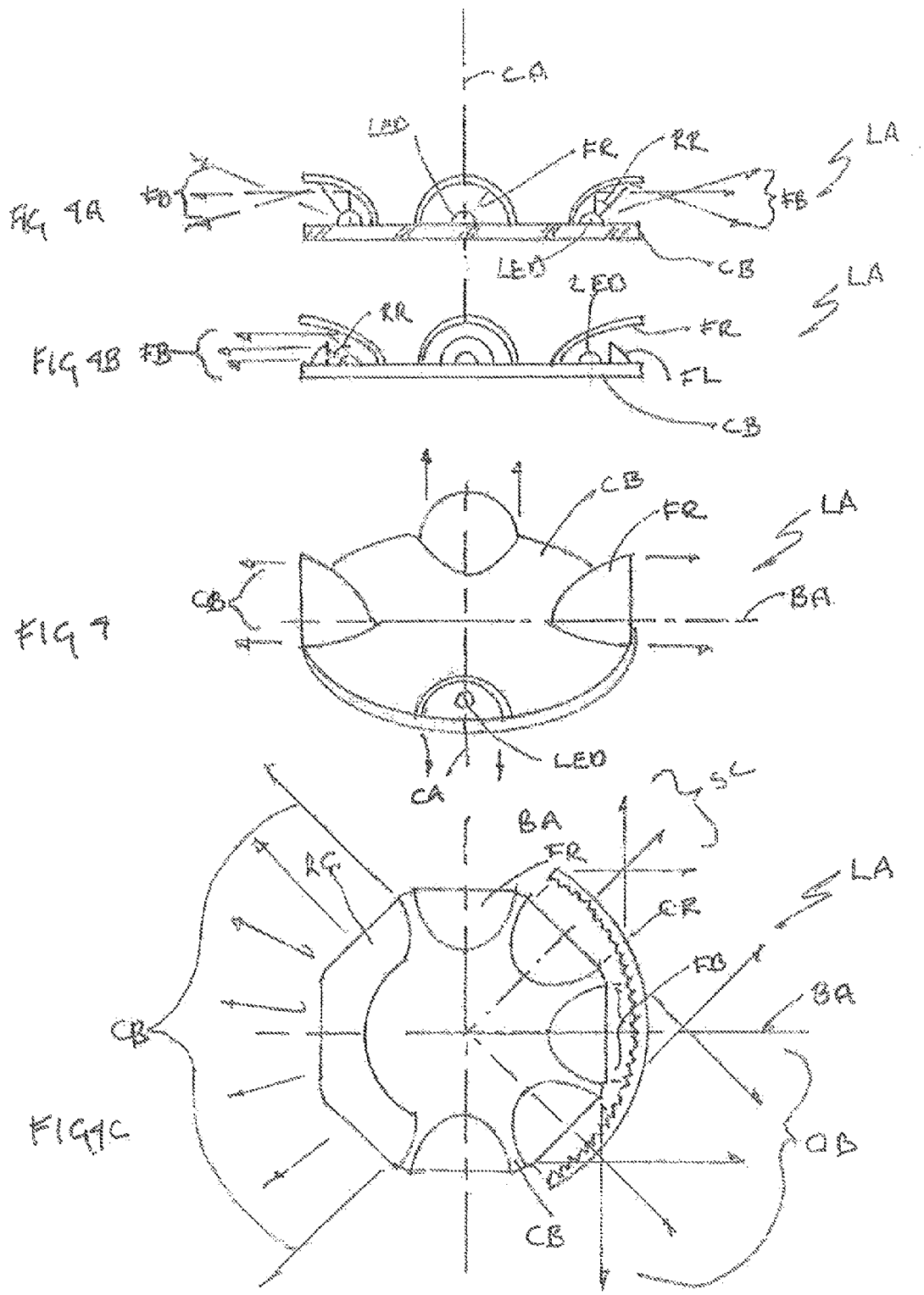

LED OPTICS FOR BULBS AND LUMINAIRES

This application is a continuation of U.S. patent application Ser. No. 13/705,684, which issued as U.S. Pat. No. 8,899,783 on Dec. 2, 2014, which patent claims the benefit of priority from U.S. Ser. Nos. 61/630,119 filed Dec. 5, 2011 and 61/741,173 filed Jul. 13, 2012, the entire contents of which are hereby incorporated herein by reference.

FIELD AND BACKGROUND OF THE INVENTION

The present invention provides light bulbs and luminaires that provide radially directed lighting that can be used for indirect surface illumination, and can be used in shallow and or in large diameter fixture applications; as also a bulb that is a simple and direct method for converting and or retrofitting a lamp or ceiling socket to be a beam directing accent light luminaire; and also a bulb or luminaire that provides multiple types of illumination separately or simultaneously.

Other objects, features and advantages will be apparent from the following detailed description of preferred embodiments taken in conjunction with the accompanying drawings in which:

BRIEF DESCRIPTION OF THE DRAWINGS

FIG. 1B is a plan view diagram of a lighting system that incorporates the LED lighting component ring described in FIG. 1;

FIGS. 1C and 1D are cross-sectional diagrams of the lighting system as described in connection with FIG. 1A;

FIG. 1E is a diagrammatic plan view of a matrix of lighting component rings as shown and described in connection with FIG. 1;

FIG. 2C is a diagrammatic side sectional view of an LED light bulb containing a ring of LEDs surrounded by light concentrating lenses;

FIGS. 2D and 2E are a combined section view and a top view of an LED light bulb having a similar function to that shown in FIG. 2C;

FIG. 3 is a sectional side view diagram of an LED light bulb that can project a variably directional light beam;

FIG. 3A is a cutaway isometric view of the light bulb illustrated in FIG. 3 further showing ventilation of heat and therefore cooling of the bulb;

FIG. 3B is a side sectional view of an LED light bulb similar in function to that shown in FIGS. 3 and 3A containing multiple LEDs;

FIG. 3C is a side sectional view illustrating a lamp utilizing an LED bulb having a similar function to those shown in FIGS. 3 through 3B;

FIG. 3D is a cross-sectional view taken through an architectural plane showing the function of three LED bulbs as illustrated in FIGS. 3 through 3B;

FIG. 4 is a three dimensional diagram of a three dimensional diagram of a lighting component assembly similar in function to the lighting component ring described in FIG. 1;

FIG. 4A is a cross sectional view of a lighting component assembly similar to that shown in FIG. 4;

FIG. 4B is a cross sectional view of a lighting component assembly having different light collection optics than the lighting component assembly shown in FIG. 4A; and FIG. 4C is a plan view of a lighting component assembly having a variation in the lighting function to the lighting component assembly shown in FIG. 4.

PREFERRED EMBODIMENTS OF THE INVENTION

Figure 1A:
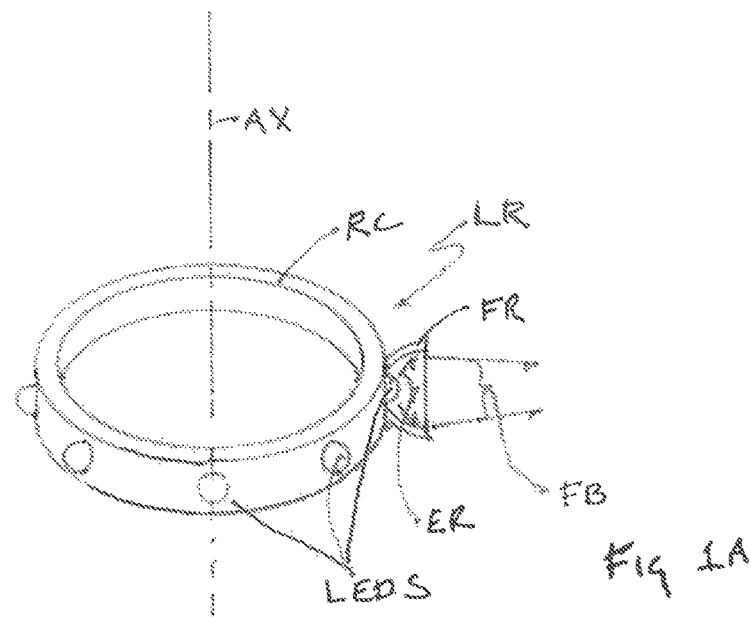
FIG. 1A is an isometric view of an LED lighting component ring similar to that shown in FIG. 1.
Figure 1:
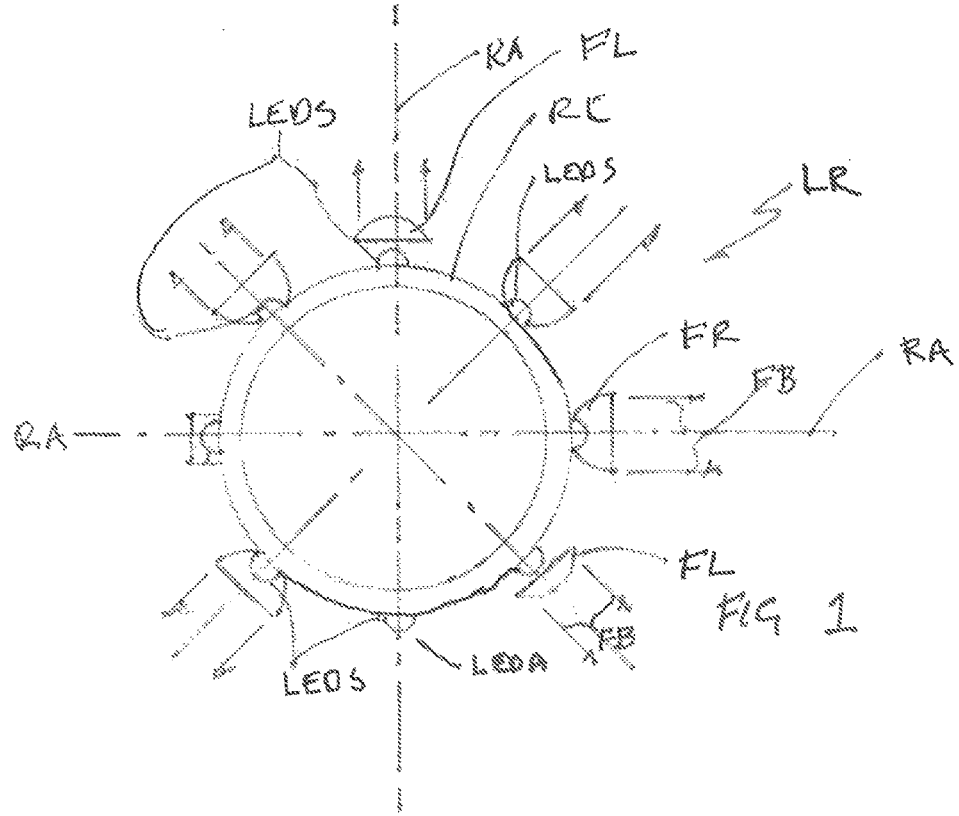
FIG. 1 is a plan view diagram of an LED lighting component ring that can be used in light bulbs or luminaires.

FIG. 1 is a plan view of a lighting component ring LR that can be used in light bulbs or luminaires comprising a ring component RC surrounding a central axis AX (fabricated from solid material such as plastic or metal) onto the outer surface of which light emitting diodes LEDS are periodically disposed. At least one of the LEDs LEDs can be at least partially surrounded by a light collecting optic such as a focusing reflector FR, for the purpose of projecting beam FB outwardly surrounding radial axis RA beam and away from lighting component ring LR. Lighting component ring OR can be designed and fabricated as an oval or a polygon in plan such as a square or hexagon.

In particular embodiments lighting component ring LR can be applied as (or be substituted for) multibeam projectors described in U.S. Pat. No. 7,677,760, which is incorporated herein by reference.

FIG. 1A is a three dimensional view of lighting component ring LR shown in FIG. 1 for explanation and graphic purposes. Only one of the LEDs LED is shown to utilize a focusing reflector FR to collect and project rays ER emanating from one of the LEDs LED as a focused beam FB away from lighting component ring LR.

FIG. 1B is a plan view of a lighting system configuration LS, incorporating optical ring OR, that at least partially surrounds and incorporates the function of lighting ring component LR as illustrated in FIGS. 1 and 1A. Optical ring OR is shown to be substantially concentric to lighting ring LR. In other embodiments light component ring OR can be an oval or a polygon in plan such as a square or hexagon and can be congruent to the lighting component when ring LR is of a similar shape. To illustrate variations in the size, shape and function, optical ring OR is graphically divided into a right portion ORR which is shaped in section to be an optical window comprising prismatic elements and having a refractive function such as bending, focusing, expanding or diffusing typical beam FB received from the periodically disposed LEDs LED mounted to ring RC of lighting component ring OR which is either a warped or flat plane in section, having the combined function of a light guide and a refracting function. Each portion, ORR and ORL, can be continuous or as illustrated can be radially divided into segments as, each segment of which can have a different optical function. In this embodiment two types of lighting functions (beam patterns) are achieved by respective alternating segments as of optical ring portions ORR or ORL (as further described in connection with FIGS. 1C and 1D).

Figure 2:
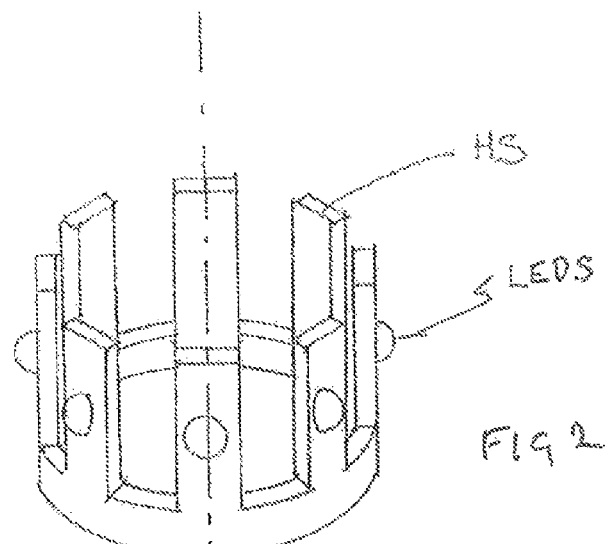
FIGS. 2, 2A, and 2B are diagrammatic views of existing technology currently used in LED light bulbs.
Figure 2A:
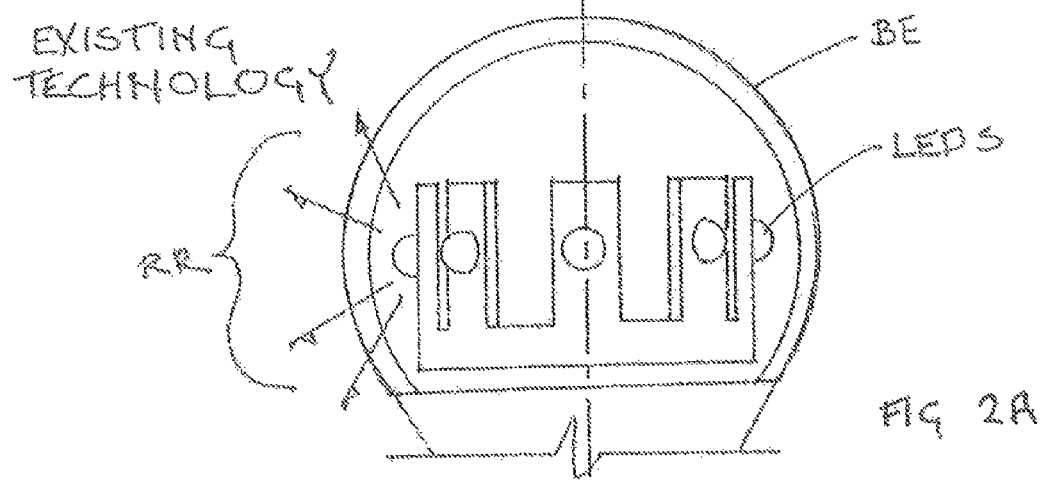

FIGS. 1C and 1D are cross-sectional diagrams of the lighting system LS as illustrated in FIG. 2A.

The refracting function of segment AS of right ring portion ORR of FIG. 1C is to bend beam FB projected by reflector FR at an angle downward as beam D (relative to the drawn figure). The refracting function of segment AS of right ring portion ORR of FIG. 1D is to bend beam FB projected by reflector FR at an upward angle as beam IB (relative to the drawn figure).

The combined light guide and refractive functions of segment AS of left ring portions ORL of FIG. 1C are to allow a part of beam FB to pass through and a part of beam FB to be refracted upwardly as combined CB (relative to the drawn figure).

The combined light guide and refractive functions of segment AS of left ring portion ORL of FIG. 1D is to allow apart of beam FB to pass through as beam RB and a part of beam FB to be refracted downward as beam DB (relative to the drawn figure). The variations and alternations of segments AS of lighting systems provide multiple light distribution patterns for the lighting system. By on/off switches or dimming of LEDs a single or multiple distribution patterns could be achieved. FIG. 1D further shows a bulb base BA illustrating that the configurations in FIGS. 1 through 1D can be incorporated into LED light bulbs as illustrated in FIGS. 2C through 2E.

FIG. 1E is a plan view diagram of a matrix MA of lighting rings LR (which are described in connection with FIGS. 1 and 1B) positioned on the intersection CE of a matrix of axes S. The lighting rings are connected by modified light guides LG which are each parallel to or surround an axis AX. The LEDs LED are so disposed about the lighting rings LR to project light directly into an end of an associated light guide LG. A collecting optic such as a reflector FR, that is connected to the lighting component ring LR or is fabricated integral to the light guide LG, can be employed to increase the intensity of the light entering the light guide LG, and as in the light guide LG comprising internally refracting prisms RR increasing the intensity of the light exiting the ring, shown as rays ER. Rotational arrow RA describes that in some embodiments light guides via a bearing mechanism M can be made to rotate about axis AX so as to change the direction of the rays ER.

Alternate ways connected light guides LG can project or emanate light include ones that contain refracting or reflecting particles, ones that taper TG radiating rays SR, ones that allow to pass through an exit beam EB or ones that have a moveable reflector RE to change the direction of exit beam EB. Light guides LG can be the primary structure connecting lighting ring LR. Structural hubs HU and struts ST can be employed to create three dimensional structures such as tetrahedrons. Hub H can comprise LEDs LED and struts ST can function as light guides.

Figure 2B:
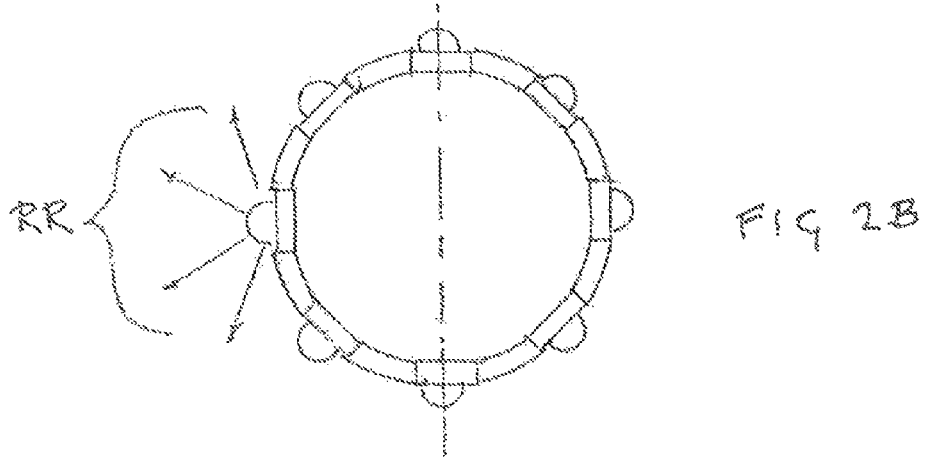

FIGS. 2, 2A, and 2B are a three dimensional diagram, a side view diagram and a top view diagram of components and configurations of existing LED light bulb technology for creating single function non-concentrated light distribution similar to that of a filament type or compact fluorescent type lamp shaped bulb. The components for this technology are as follows: LEDs LED radiating substantially a lambertian light distribution RR, mounted to a heat sink assembly HS, the heat sink assembly HS enclosed within a bulb enclosure BE. The base of the bulb is not shown.

FIG. 2C is a combined side view section diagram of an LED light bulb containing a ring of outwardly facing LEDs LED mounted to a ring-like heat sink configuration HS. Surrounding and enclosing the ring of LEDs LED and its associated heat sink HS is a bulb envelope BE. Integrally formed (molded) or fabricated onto the bulb envelope BE is a ring of light concentrating lenses FL, each disposed and positioned to collect and project rays RR emanating from its associated LED as a concentrated beam CB outwardly and away from the central axis AX and from the bulb LB. A partial view of base BD can comprise electrical and or electronic hardware and can be a screw, pin, or prefocus male type socket.

FIGS. 2D and 2E are a combined side view section and a top view section of an LED light bulb LB similar in function to the light bulb illustrated in FIG. 2C differing in that the bulb enclosure BE comprises a ring of outwardly projecting reflectors FR and or reflector FR-refractor FL combined. Formed or fabricated into bulb envelope BE and disposed so as to collect and project rays RR emanating from an associated LED LED as a concentrated beam outwardly and away from bulb LL along and surrounding a radial axis AR. FIG. 2E also illustrates refractor SR which comprises prismatic element which spreads concentrated rays of beam SR. Refractor FR can be located immediately in front of collecting reflectors RR, attached to or part of bulb envelope BE or be disposed at a distance as part of a luminaire that at least partially surrounds bulb LB.

FIG. 3 is a side view sectional diagram of an LED light bulb LB that can project a variably directional beam VB. Beam VB is produced by an optical configuration having a light emitting diode LED disposed within the bulb envelope BE and a concentrating optic such as reflector RF at least partially surrounding the LED LED. This optical configuration is mounted to an axle XL which spans between and passed through at least one wall of the bulb envelope BE at a pivot point PP located on the transverse axis TA of bulb BE. Bulb base BL can be of a screw, pin, prefocus or any other type standard or custom bulb envelope be it clear or diffuse or comprise prismatic elements.

Bulb LB comprises a substantially spherical bulb envelope BE which is fabricated from transparent or translucent material such as glass or plastic or other material that allows for the passage of light, and includes a bulb base BS which is connected to the bulb envelope BE via a bearing sleeve BS (not detailed) so that the bulb envelope can rotate in respect to the bulb base about axis VA as illustrated by arrow AA.

The combined rotation of the bulb envelope BE around its axis VA and the rotation of heat sink HS around transverse axis TA provides for at least a minimum of 270° of spherical freedom for manually directing beam VB.

FIG. 3A is a cutaway isometric view of the light bulb illustrated in FIG. 3 further showing that axle XL is a tube the ends of which are disposed within holes H located in bulb envelope BE located substantially about axis TA allowing airflow FL to evacuate from the bulb envelope lowering the temperature of heat sink HS.

FIG. 3B is a side view section diagram of an LED light bulb similar in function to that shown in FIGS. 3 and 3A differing in that light produced by the bulb LB is derived from multiple LEDs LED and is in the other form of a flood beam FB. In other embodiments (not shown) at least one of the LEDs LED can be at least partially surrounded by a light modifying optic such as a focusing lens, focusing reflector, or diffuser.

FIG. 3C is a side view diagram illustrating the use of a light bulb LB (similar to that shown in FIGS. 3, 3A, and 3B) in a table or floor lamp LA that can provide a beam B for reading or any other lighting application.

FIG. 3D is a cross-sectional diagram taken through a ceiling (or other architectural plane) CR showing three light bulbs LB1, LB2, and LB3 mounted within typical light receptacle JB, projecting their respective beams B1, B2, and B3 in various directions.

FIG. 4. is a three dimensional diagram of a lighting component assembly LA similar in function to the lighting component ring LR described in FIG. 1, differing in that the LEDs LED are mounted to a pc board CB instead of a ring, their light emanating in the direction of the central axis CA which is substantially perpendicular to pc board CB. At least one of the LEDs LED is at least partially surrounded by a light collecting optic such as a ellipsoidal or parabolic reflector FR, which collects and projects light emanating from the LED as a focused beam FB in the direction of and at least partially surrounding beam axis BA away from central axis CA. Lighting component assembly LA can in some embodiments (such as the lighting system configuration that is discussed in connection with FIG. 1B) be as to substitute for lighting component ring LR.

FIG. 4A is a cross sectional diagram of the lighting component assembly shown in FIG. 4 illustrating light collecting optic FR collecting and reflecting rays RR emanating from LED LED as concentrated beam FB away from central axis CA.

FIG. 4B is a cross sectional diagram of a lighting component assembly LA similar to that shown in FIG. 4A differing in that the light collecting optic combines at least a segment of a concentrating lens FL and at least a segment of a reflector FR, the combined function of which can collect and project substantially the entire flux of radiant rays emanating from the LED LED.

FIG. 4C is a planar view of a light component assembly LA similar in structure and function as that shown in FIGS. 4 thru 4B, that further includes a continuous reflector RC that can collect and project rays emanating from at least 2 LEDs as a continuous radial beam CB outwardly and away from central axis CA. FIG. 4C further illustrates refracting ring CR widening focused beams FB as spread beams SC that can radiate and mix with adjacent spread beams as overlapping beam OB.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

The invention claimed is:

1. An LED light bulb comprising:
 a combination of optical and mechanical elements disposed within a bulb envelope for creating a directional beam that can be manually aimed toward and onto various targets that may require illumination, including at least one LED mounted to a heat sink, the heat sink which is mechanically attached to the bulb envelope is fabricated at least in part as rotary axle on which the LED is mounted, allowing for the LED to rotate within the bulb envelope around an axis that transverses the wall of the bulb envelope, the bulb envelope (at least a portion of which is fabricated from a material through which light emanating from the LED can pass), is attached to a bulb base via a rotary bearing surrounding an axis of rotation (that extends from the bulb base through the bulb envelope), the rotary bearing allowing the envelope to axially rotate (and in turn the rotary portion on the heat sink), in respect to the bulb base; the bulb base providing the electrical continuity required for the illuminating function of the LED bulb;
 wherein the combined axial rotation of the bulb envelope in respect to the bulb base, and axial rotation of the heat sink provides for a spherical degree of freedom for aiming and projecting the light emanating from the LED.

2. An LED light bulb as in claim 1 wherein the axis of rotation of the rotary portion of the heat sink and the axis of rotation of the bulb envelope are substantially perpendicular to each other.

* * * * *